June 12, 1962 K. H. WILCOXON 3,039,078
STABILIZED ECHO DEPTH SOUNDING APPARATUS
Filed March 17, 1959 3 Sheets-Sheet 1

INVENTOR
KENNETH H. WILCOXON
BY
B. L. Zangwill
ATTORNEYS.

INVENTOR
KENNETH H. WILCOXON
BY
ATTORNEYS.

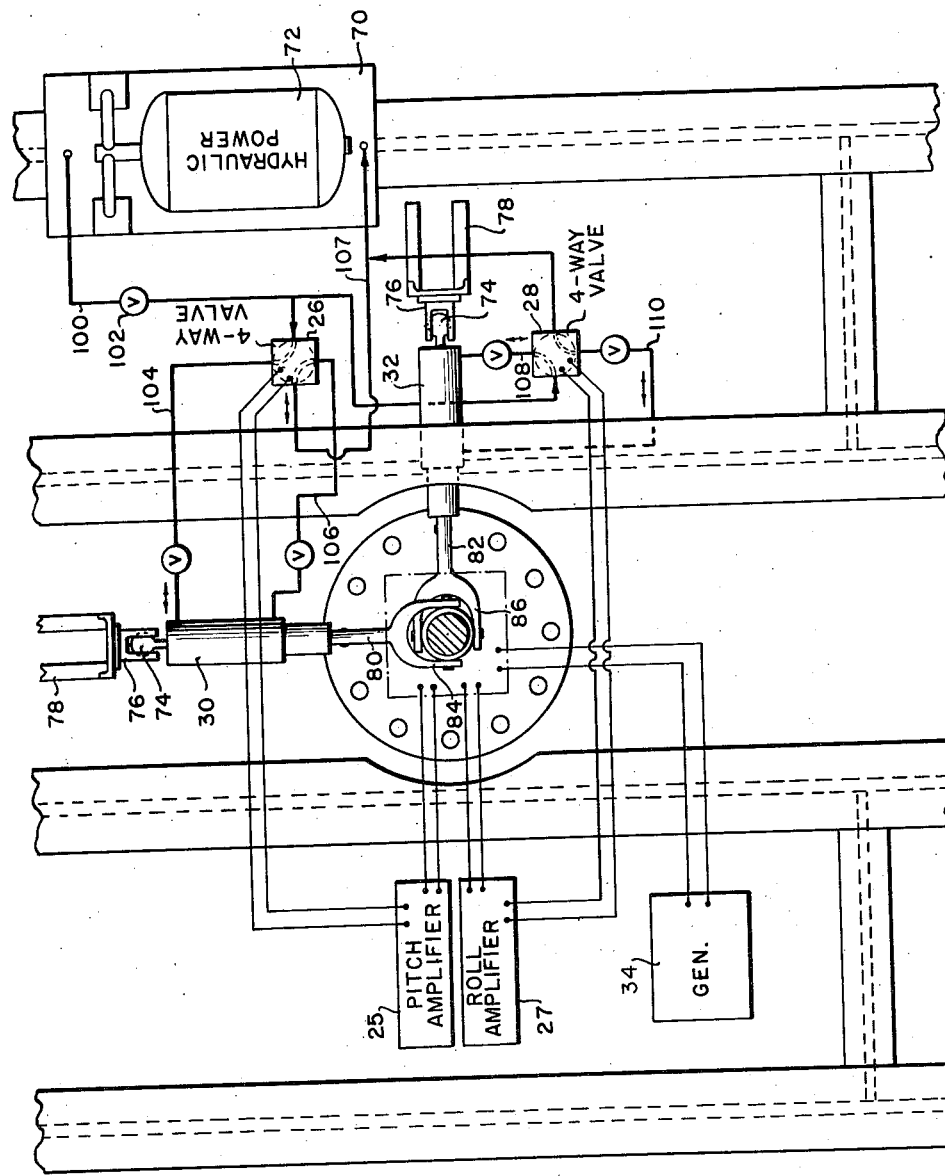

3,039,078
STABILIZED ECHO DEPTH SOUNDING APPARATUS

Kenneth H. Wilcoxon, Cabin John, Md., assignor to the United States of America as represented by the Secretary of the Navy
Filed Mar. 17, 1959, Ser. No. 800,064
4 Claims. (Cl. 340—5)
(Granted under Title 35, U.S. Code (1952), sec. 266)

The invention described herein may be manufactured and used by or for the Government of the United States of America for governmental purposes without the payment of any royalties thereon or therefor.

This invention relates to a stabilized echo depth sounding or sonar system, and more particularly to a means for stabilizing an echo depth sounding or sonar system aboard a ship so as to maintain the beam produced by a depth sounding transducer, in said system in a vertical plane.

In accordance with prior art practice, a transducer, on an echo depth sounding system, hereinafter referred to as a depth sounder, is usually fixedly connected to the ship so that the sound beam emanating from the transducer moves with the movement of the ship when the ship either rolls and/or pitches, thereby tending to introduce errors in sounding when it is desired to utilize said soundings to determine the contour of the floor of a body of water. It has therefore been found highly desirable to provide a means whereby the beam emanating from a depth sounding transducer is maintained in a vertical plane in spite of the pitch and/or roll of the ship to which the transducer is attached.

In accordance with the instant invention, a depth sounding transducer is affixed to the lower end of a vertical shaft that extends through a hull bottom and is connected to said hull by means of a ball and socket arrangement, the transducer being at the lower end of said shaft and located externally of the hull of the ship. The upper end of the aforementioned shaft has attached thereto a vertical, resistance pickoff gyro of the type frequently used in aircraft stabilization systems. The instant apparatus further includes a pair of hydraulic actuators, hereinafter referred to as hydraulic cylinders, that are both located in a horizontal plane and extend at right angles to one another. Each of said actuators having a fixed portion thereof pivotly attached to the hull of the ship and having the free end of a hydraulically actuated armature pivotly attached to the transducer carrying shaft at points displaced 90° about said shaft. When, for example, the ship rolls there is a signal output from the gyro corresponding to the number of degrees of roll. The signal is fed through a conventional amplifier, and the amplified signal is utilized to actuate a servo valve so as to open said valve and allow fluid to flow from a reservoir into one of said hydraulic actuators. Fluid is allowed to flow into the hydraulic actuator until the armature thereof has moved the transducer carrying shaft to a vertical position so as to correct for the roll of the ship; movement is halted at such time due to the restoration of the gyro to a vertical position thereby terminating the correction signal from such gyro. It is pointed out that pitch correction is made in the same manner as roll correction, there being a signal output from the gyro corresponding to the pitch of the ship, which signal is in turn amplified and utilized to actuate another servo valve which in turn permits hydraulic fluid to flow into the second of the hydraulic actuators, said second hydraulic actuator being used to return the aforementioned shaft to a vertical position thereby correcting for pitch of the ship. Thus the instant invention provides a means for maintaining a depth sounding, transducer supporting shaft in a vertical position regardless of the pitch and/or roll of a ship.

It is accordingly an object of this invention to provide a depth sounding system that overcomes the aforementioned disadvantages found in the prior art.

A further object of this invention is to provide a ship with a depth sounding transducer, the beam from said transducer remaining in a vertical plane regardless of the pitch and/or roll of the ship.

Another object of this invention is to provide a ship with a depth sounder, the depth sounding transducer of which is adapted to move relative to the ship in compensation for the roll and/or pitch of the ship so as to maintain the beam emanating from the transducer in a vertical plane at all times.

Still another object of this invention is to provide a ship with a gyro stabilized, echo depth sounder having a depth sounding transducer as part thereof, said transducer producing a beam adapted to be maintained in a vertical plane by said gyro stabilizer, in spite of pitch and/or roll of the ship.

An added object of this invention is to provide a ship with an echo depth sounder, including a depth sounding transducer, said transducer being pivotly connected to said ship by a universal connection, and including means whereby the beam produced by said transducer is maintained in a vertical plane in spite of pitch and/or roll of said ship.

Other objects and many of the attendant advantages of this invention will be readily appreciated as the same becomes better understood by reference to the following detailed description when considered in connection with the accompanying drawings, wherein:

FIG. 3 is a plan view, partially broken away, and partially schematic, showing the electrical and mechanical control apparatus utilized in conjunction with the instant invention.

Figure 1:
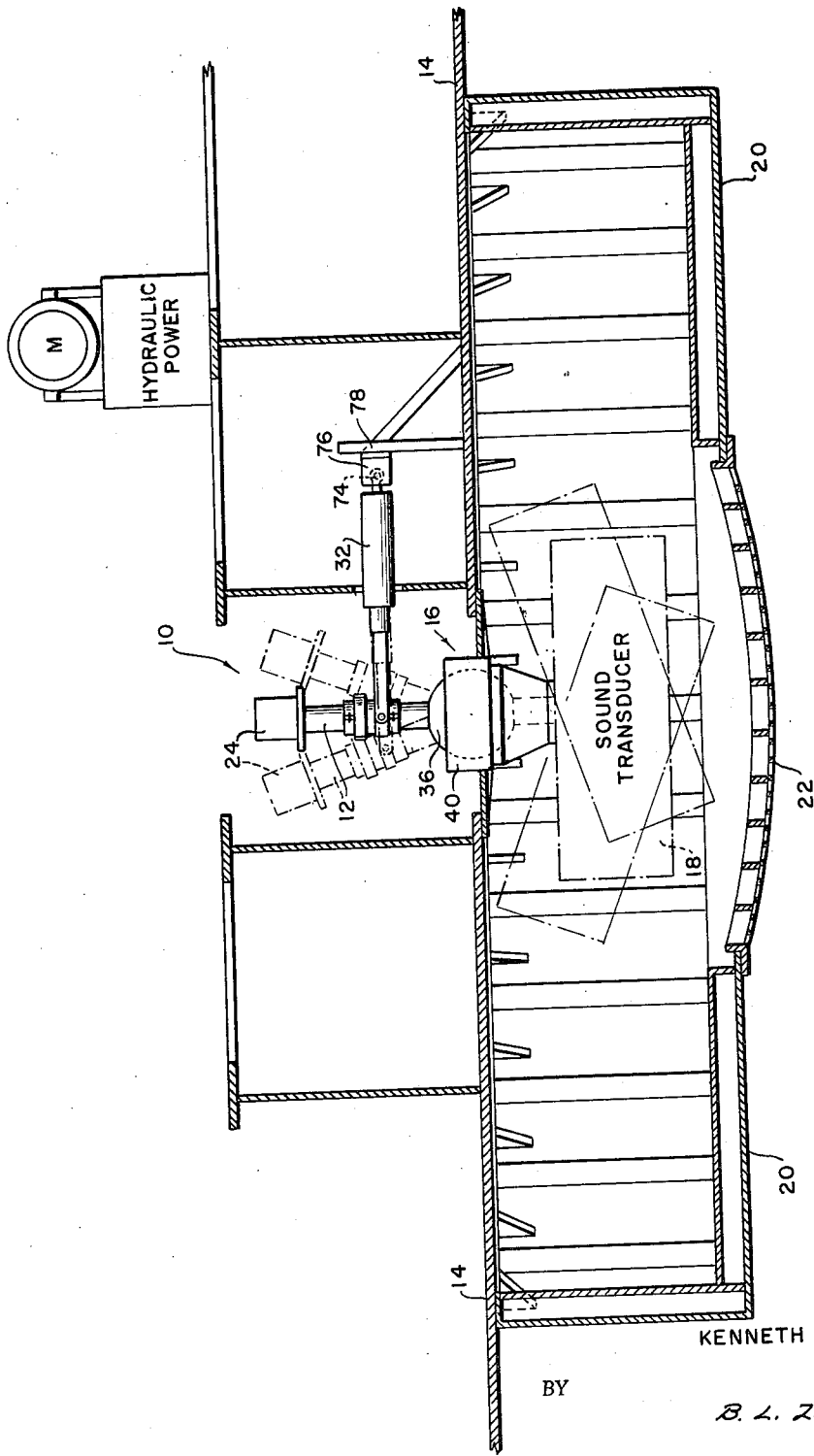
FIG. 1 is an elevational view, in section and partially broken away, of a ship provided with a stabilized echo depth sounder produced in accordance with the instant invention.

Referring now to the drawings wherein like reference characters designate like or corresponding parts throughout the several views, there is shown in FIG. 1 the general arrangement of a stabilized echo depth sounder 10 produced in accordance with the instant invention.

Figure 2:
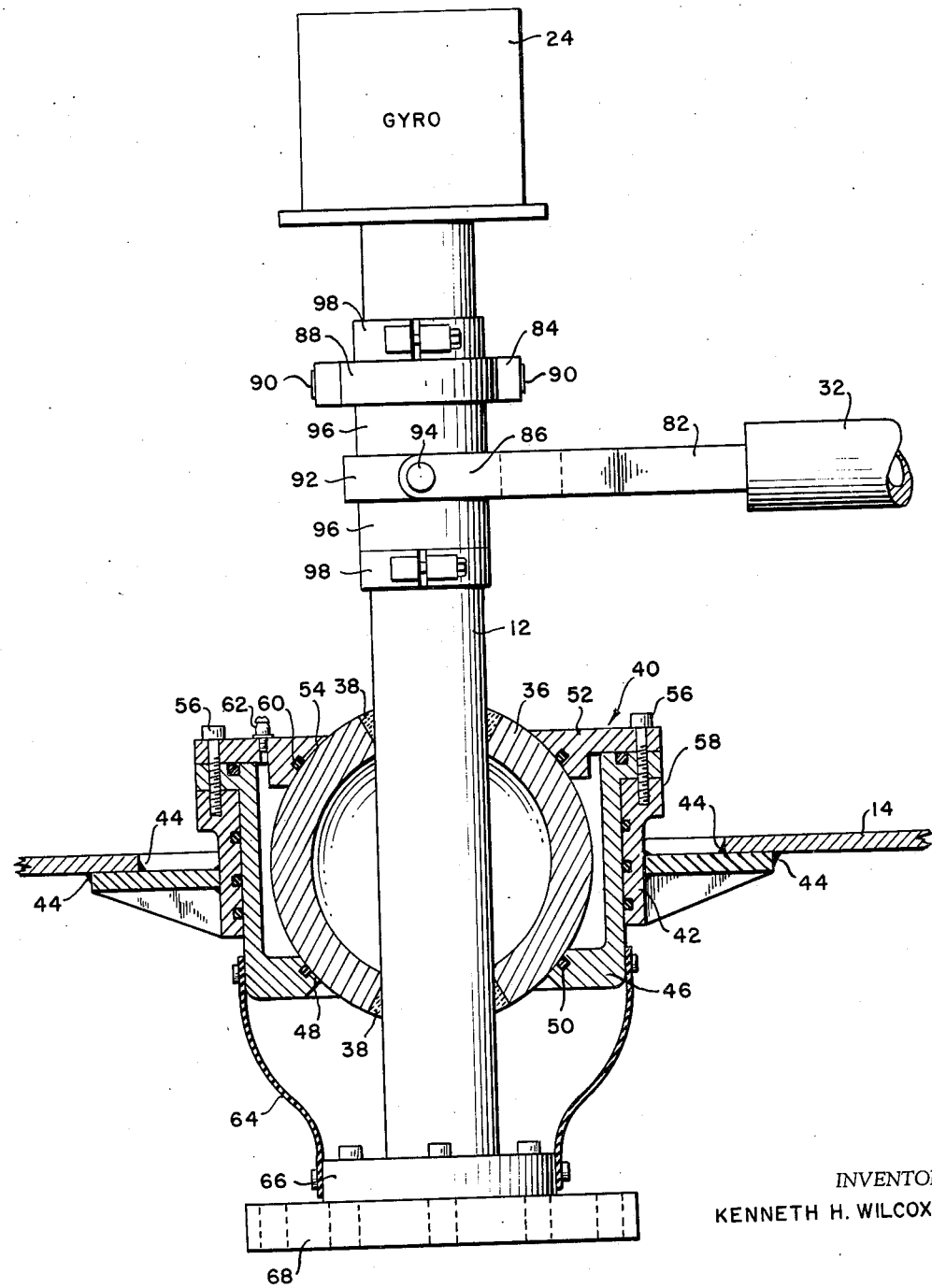
FIG. 2 is an elevational view, in section, and partially broken away, of a portion of the instant stabilized echo depth sounder showing the connection thereof to a hull of a ship.

The echo depth sounder 10 (FIGS. 1 and 2) includes a vertical shaft 12 extending through the hull 14 of a ship, said shaft being universally journaled in said hull by means of a ball and socket connection 16. The lowermost or exterior end of the shaft has fixedly connected thereto a sound beam producing transducer 18. The transducer 18 is surrounded by a sonar dome or blister 20 of substantially oval shape having the uppermost edge thereof connected to the exterior of the ship hull 14 and having a perforate sound transparent window 22 in the lower face thereof. The blister 20 is adapted to eliminate the effects of water turbulance about the transducer 18 and is normally filled with water through the perforate window 22.

The upper end of the shaft 12 (FIGS. 1–3) has a vertical gyro 24 attached thereto, which gyro is of the type well known in the art, and is frequently used as a component of an autopilot for aircraft. In accordance with conventional practice, the gyro 24 consists of an electrically driven, high speed rotor, universally mounted in a conventional manner. A typical example of a gyro that is adapted for use in this invention is the one manufactured by the Minneapolis Honeywell Corp., Model JG–7003a–11. Vertical direction is established and maintained on the gyro by gravity-sensitive mercury switches mounted on the two horizontal axis each controlling an electro-precessing motor, all of which is conventional in the gyro art. The gyro further includes potentiometer, or resistance, pick-offs on each horizontal axis to indicate the direction and amount of deviation of the gyro base from horizontal, which deviations correspond to the roll and/or pitch of the ship. The output of the potentiometer pick-offs is fed through a pair of conventional, two stage, push-pull amplifiers 25 and 27 that are substantially identical to one another. Any output from the respective potentiometers is amplified and used to actuate either of a pair of fourway servo valves 26 and 28 of the Moog 14–14A type shown schematically in FIG. 3, each of which controls the flow of hydraulic fluid from a pump system to a pitch correction hydraulic cylinder 30 and a roll correction hydraulic cylinder 32 for purposes of restoring the shaft 12 to a vertical position in compensation for pitch and/or roll of the ship. In addition, an electrical generator 34 supplies current to the gyro potentiometers and the other electrical components of the system.

The vertical shaft 12 is provided intermediate its ends with a ball member 36 (FIGS. 1 and 2) which is connected to the shaft by welding. The ball member 36 is swivelly mounted within a box 40 that extends through the hull 14 of a ship. The box 40 comprises a cylindrical sleeve 42 welded at 44, or otherwise fixed to the hull 14 in waterproof relation. The cylinder 42 has concentrically mounted on the interior thereof, an open ended box element 46 having a hole 48 in the bottom thereof, through which the shaft 12 passes and which hole is so constructed as to provide a slidable water-tight fit with the external surface of the ball 36. A watertight seal is maintained between the edge of the hole 48 and the ball 36 by means of an O ring 50 located within a recess provided at the edge of said hole 48, said O ring being in surface, waterproof contact with the surface of the ball 36.

A plate 52 (FIG. 2) having an accurately beveled hole 54 formed in the center thereof is bolted by screws 56 to a flange 58 provided at the upper edge of the cylindrical box element 46, and to the sleeve 42. The arcuately beveled surface 54 on the plate 52 is in surface contact with the ball 36, and a waterproof connection between the plate and the ball is maintained by an O-ring or gasket 60 located in a recessed area in the surface of the arcuately beveled surface 54, said O-ring being in surface contact with the ball 36 adjacent its uppermost portion, all as clearly shown in FIG. 2. The elements are so proportioned that the ball is maintained in tight waterproof connection with the upper plate and the lowermost portion of the cylindrical box element 46. Thus the shaft 12 is adapted to be universally swivelled relative to the box 40 and thus relative to the hull 14 of the ship. The interior of the journal box 40 surrounding the outer surface of the ball 36 is adapted to be filled with lubricating grease or the like through a ball check valve, or Alemite fitting 62 provided in the upper plate 52.

The lowermost end of the shaft is provided with a flexible boot 64 that surrounds the shaft in moisture-proof arrangement therewith, the upper edge of said boot being bolted or otherwise fastened to the lower edge of the box element 46, and the lower end of said boot being bolted to a flange 66 provided on the lower end of the shaft 12. The flange 66 is in turn provided with a connecting plate 68 adapted to hold the depth surrounding transducer 18.

The hydraulic system (FIG. 3) utilized in the instant invention comprises a reservoir 70 for hydraulic fluid and a motor driven pump 72 for pumping fluid from said reservoir to the respective cylinders 30 and 32.

Each of the hydraulic cylinders 30 and 32 (FIG. 3) has its outermost end pivotly connected by a ball 74 and socket 76 arrangement to a bracket 78 fixedly connected to the interior of the hull 14, and is thus adapted for universal movement about said ball and socket connection. The cylinders 30 and 32 are respectively provided with a laterally movable armature or piston rod 80 and 82 extending toward the vertical shaft 12. The free end of each of the armatures 80 and 82 is provided with a yoke 84 and 86 respectively. Both of the yokes 84 and 86 are adapted to straddle the shaft 12. The yoke 84 is pivotly carried by a swivel ring 88 rotatably carried on the shaft 12, and having a pair of pivot pins 90 on the periphery thereof in pivotal engagement with the yoke 84. The yoke 86 in turn pivotly carried by a second pivot ring 92 rotatably mounted on the shaft 12 in spaced relation with the ring 84. The swivel ring 92 has a pair of pivot pins 94 on its periphery in pivotal engagement with the yoke 86. The swivel rings are separated by spacer bands 96, and are supported by a pair of collars 98 on the shaft 12. By virtue of the pivotal engagement of the yokes with the swivel rings, and the pivotal engagement of said rings with the shaft 12, there is little or no possibility of binding between the armatures and the shaft 12.

A fluid supply line 100 (FIG. 3) having a main flow control valve 102 therein is connected through the four-way servo valves 26 and 28 to the cylinders 30 and 32 respectively. Referring more specifically to the pitch correction cylinder 30, it is pointed out that the four-way servo valve 26, which is of conventional construction and has a pair of arcuate passageways therethrough of the type shown in dotted lines in FIG. 3, has one pipe line connection 104 to one side of the piston in the pitch correction cylinder 30 and a second line 106 connected to the opposite side of said piston. A third pipe-line 107 forms a fluid return conduit from the valve 26 to the supply reservoir 70. The four-way servo-valve 26 is so constructed that in response to amplified potentiometer pickup signal from the gyro it is adapted to allow fluid to flow to either side of the piston in the pitch correction cylinder 30 through either of the lines 104 or 106 shown in FIG. 3, thus causing the piston and the armature 80 to move in a direction suitable to correct for the pitch of the ship and thus maintain the shaft 12 in a vertical position.

The four-way servo-valve 28 (FIG. 3) associated with the roll correction cylinder 32 is identical in construction to the above-described valve 26 associated with the pitch correction cylinder. The valve 28 operates in the same manner as the valve 26, having the fluid receiving line 100 connected thereto from the fluid supply reservoir, and having a pair of fluid lines 108 and 110 extending to the cylinder 32 for feeding fluid to opposite sides of the piston contained in said cylinder, so as to move the piston and therefore the armature 82 in opposite directions to correct for roll of the ship. The four-way valve 28 is also provided with a fluid return line 112 connecting the same to the fluid supply reservoir 70 so that when the piston is moved in one direction fluid will exit from the opposite side thereof through the four-way valve 28 and the line 112 to the fluid supply reservoir.

*Operation*

Attention is particularly directed to FIGS. 1 and 3.

In operating the instant invention, the generator 34 is turned on thereby activating the roll and pitch amplifiers respectively, and starting rotation of the gyro wheel in the gyro 24. At the same time the hydraulic equipment is activated and the valve 102 leading to the hydraulic cylinders is opened.

As is well known, the axis of the rotating spindle in a gyro tends to maintain itself vertical except for the effects of precession, for which the instant gyro, as set forth above, includes correction means of a conventional type.

Assuming that the ship has been subjected to a pitching motion, and more particularly to downward movement of the bow, assuming the bow to be at the right-hand side in FIG. 1, the vertical transducer supporting shaft 12 will be tilted towards the right which will cause the gyro cage to rotate about one of its horizontal axes thereby causing a corresponding signal output from the potentiometer pickoff that detects pitch movement of the ship. The pick-off signal is fed into the pitch amplifier 25, and after amplification is fed to the four-way servo-valve 26 that serves the pitch correction cylinder 30. The servo valve is so constructed and activated that when the bow of the ship pitches downwardly fluid is allowed to flow from the hydraulic reservoir 70, through the lines 100 and 104 to the upper side of the pitch cylinder 30, as viewed in FIG. 3. This causes outward movement of the armature 80 which in turn causes corrective movement of the vertical shaft 12 to substantially the position shown in dotted lines at the left in FIG. 1, thereby maintaining the beam emanating from the transducer 18 in a vertical plane.

In the case of ship roll, the shaft 12 and gyro housing tilt to one side in such a manner as to produce a signal on the potentiometer pick-off corresponding to the number of degrees of roll. The roll correction signal is fed to the roll amplifier 27, and, after amplification, is fed to the four-way servo valve 28 causing said valve to be actuated in such a manner as to allow fluid to flow from the reservoir 70 to the hydraulic cylinder 32 causing either outward or inward movement of the armature 82, depending on the direction of roll, so as to cause a corresponding correction in the position of the shaft 12 thereby maintaining said shaft and of course the beam emanating from the depth sounding transducer 18 in a vertical plane. It is emphasized that once the shaft 12 is restored to a vertical position, either after ship roll or pitch, the signal output from the respective potentiometers on the gyro of course drops to zero, causing the particular servo-valve, either 26 or 28 to assume its normally closed position, with both lines 104 and 106 closed to fluid flow by said valve.

It is pointed out that when fluid is flowing into the cylinder 30 (FIG. 3), for example, to one side of the piston through the line 104, it is flowing out from the other side of the piston through the line 106 and the valve 26 to the reservoir 70. Of course when the direction of armature is reversed the valve 26 assumes a position so that fluid flows in through line 106 and out through line 104.

The same flow pattern applies to the cylinder 32, valve 28 and the fluid lines 108 and 110.

In the case of combination pitch and roll, of course both hydraulic cylinders will be actuated to maintain the transducer supporting shaft 12 in a proper vertical position.

It is accordingly pointed out that in accordance with the instant invention, a ship is provided with an echo depth sounding transducer particularly suited for measuring the contour of the floor of a body of water in which the ship is sailing, by maintaining the beam emanating from the depth sounding transducer in a vertical plane at all times. The result has been impossible in the past, since depth sounding transducers have in the past been fixedly connected to a ship hull, which will of course cause erratic movement of the beam emanating from the depth sounding transducer due to pitch and/or roll of the ship. The instant invention provides a relatively simple and reliable means for maintaining the beam produced by a depth sounding transducer in a vertical plane in spite of pitch and/or roll of the ship upon which the transducer is mounted.

It should be understood, of course, that the foregoing disclosure relates to only a preferred embodiment of the invention and that numerous modifications or alterations may be made therein without departing from the spirit and scope of the invention as set forth in the appended claims.

What is claimed is:

1. A stabilizing means for maintaining in vertical position an echo depth sounding apparatus carried upon the hull of a ship, said stabilizing means comprising, a substantially vertical shaft within said hull and having a portion thereof extending outside of said hull, a ball member through which the shaft extends, said ball member being fixedly mounted on said shaft intermediate its ends, a box member affixed to said hull, said box member having a socket formed therein and within which said ball is pivotally mounted, whereby said shaft is universally pivoted to the hull, a sound beam producing transducer affixed to the lower end of said shaft, outside said hull; a gyroscope mounted on the innermost end of said shaft and adapted to move with said shaft, said gyroscope having a preset neutral position, said gyroscope having means for producing an electrical output signal in response to movement of said gyroscope from said neutral position upon movement of said vertical shaft from a vertical position during pitch and roll of the ship; actuating means drivably connected to said shaft at points spaced 90° apart about the periphery of the shaft, and a control means utilizing the electrical output of said gyroscope to energize said actuating members to move said shaft relative to the hull of the ship until said shaft is restored to its vertical position wherein said gyroscope is in its neutral position thus terminating its output signal, whereby the sound beam produced by said transducer is maintained in a vertical plane at all times in spite of ship roll and pitch.

2. A stabilizing means as set forth in claim 1 wherein said actuating means comprises a pair of hydraulic cylinders, each of said cylinders having an armature reciprocable therein, said armatures being connected to said shaft, and a fluid pressure source selectively connectable to said cylinders to actuate said armatures; and wherein said control means comprises a pair of four-way servo valves interconnected between said fluid pressure source and said hydraulic cylinders, and a pair of amplifiers for amplifying the electrical output of said gyroscope and transmitting it to said servo valves to operate said valves and to thereby connect said fluid pressure source to said hydraulic cylinders to actuate said armatures, whereby when said gyroscope signal is produced upon movement of said shaft from its neutral position, said signal is transmitted through said amplifiers to said valves which in turn connect said fluid pressure source to said hydraulic cylinders to actuate the armatures therein, said actuated armatures being movable to pivot said shaft about its pivot connection to said hull and restore it to its neutral position wherein said gyroscope and said transducer are concurrently in their neutral positions, thereby terminating said gyroscope electrical signal.

3. In a ship having a depth sounding apparatus attached to the hull thereof, the combination comprising a sonar dome affixed to the lower portion of said hull, said sonar dome having a perforate window in the lower portion thereof, a box member mounted within said hull opposite said perforate window and extending beyond the interior and exterior surfaces of said hull, said box member including a truncated spherical cavity in the central portion thereof to provide a socket, a spherical ball member having a central aperture extending therethrough mounted within said socket and thus defining a pivotal connection of the universal joint type, a shaft extending through said ball member central aperture and affixed to said ball member for pivotal movement therewith, said shaft having an inner end extending inwardly from said hull and into the ship and an outer end extending outwardly from said hull and into said dome, a transducer member affixed to the outer end of said shaft at a point, within said dome, substantially midway between said box member and said perforate window, a gyroscope affixed to the inner end of said shaft and having a preset neutral position corresponding to a vertical position of said shaft, said gyroscope having means for producing an electrical signal in response to movement of said gyroscope from said neutral position upon pivotal movement of said shaft about said universal joint during roll and pitch of the ship, shaft-actuating means operatively connected at one end thereof to the interior of said hull by universal connection means and directly connected at the other end thereof to the inner end of said shaft at a point, upon said shaft, substantially midway between said gyroscope and said ball member, and amplifier means for amplifying said electrical signal generated by said gyroscope and transmitting the amplified signal to said actuating means, whereby said actuating means will pivot said shaft about said universal joint until said shaft reattains its vertical position, at which point said gyroscope is returned to its neutral position and said gyroscope electrical signal is terminated.

4. The combination as set forth in claim 3 wherein said actuating means comprises a pair of hydraulic cylinders having extensible armatures therein, said armatures being located at right angles to one another and each having an end portion in the form of a yoke which surrounds said shaft, and pivot pin means pivotally connecting each of said yokes to said shaft, whereby actuation of said hydraulic cylinders causes said shaft to pivot about its universal joint connection to said hull.

References Cited in the file of this patent

UNITED STATES PATENTS

| | | |
|---|---|---|
| 1,791,014 | Settegast et al. | Feb. 3, 1931 |
| 2,019,497 | Kuntze | Nov. 5, 1935 |
| 2,825,884 | Fryklund | Mar. 4, 1958 |
| 2,832,944 | Kessler | Apr. 29, 1958 |

FOREIGN PATENTS

| | | |
|---|---|---|
| 1,038,460 | Germany | Sept. 4, 1958 |